United States Patent
Nelliappan et al.

(10) Patent No.: US 11,920,009 B2
(45) Date of Patent: Mar. 5, 2024

(54) POLYAMIDE-BASED MASTERBATCH FORMULATION

(71) Applicant: AdvanSix Resins & Chemicals LLC, Parsippany, NJ (US)

(72) Inventors: Veera Nelliappan, Richmond, VA (US); David J. Loy, Richmond, VA (US); Farzaneh Talebi, Midlothian, VA (US); Joseph Weston, Parsippany, NJ (US); Ann Schoeb, Clinton, NJ (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 373 days.

(21) Appl. No.: 17/177,185

(22) Filed: Feb. 16, 2021

(65) Prior Publication Data

US 2021/0253803 A1     Aug. 19, 2021

Related U.S. Application Data

(60) Provisional application No. 62/977,868, filed on Feb. 18, 2020.

(51) Int. Cl.
| | |
|---|---|
| *C08G 69/14* | (2006.01) |
| *C08G 69/26* | (2006.01) |
| *C08G 69/42* | (2006.01) |
| *C08J 3/22* | (2006.01) |
| *D01F 6/60* | (2006.01) |

(52) U.S. Cl.
CPC ............... *C08J 3/22* (2013.01); *C08G 69/14* (2013.01); *C08G 69/26* (2013.01); *C08G 69/42* (2013.01); *D01F 6/60* (2013.01); *D10B 2331/02* (2013.01)

(58) Field of Classification Search
CPC ........ C08G 69/14; C08G 69/26; C08G 69/42; C08G 69/36; C08G 69/28; D01F 6/60; C08L 2205/02; C08L 77/02; C08L 2310/00; C08L 77/06; D10B 2331/02
USPC .......................................... 523/351
See application file for complete search history.

(56) References Cited

U.S. PATENT DOCUMENTS

| | | | |
|---|---|---|---|
| 3,640,942 A | 2/1972 | Crampsey | |
| 4,847,322 A * | 7/1989 | Akkapeddi | ............... C08F 8/30 525/445 |
| 5,548,037 A | 8/1996 | Hoyt et al. | |
| 6,680,364 B1 | 1/2004 | Linemann | |
| 10,494,740 B2 | 12/2019 | Zhang et al. | |
| 2009/0281210 A1 * | 11/2009 | Aramaki | .................. C08L 77/00 524/413 |
| 2017/0183796 A1 * | 6/2017 | Zhang | ...................... D01D 5/08 |

FOREIGN PATENT DOCUMENTS

WO      00/04095 A1    1/2000

OTHER PUBLICATIONS

International Search Report and Written Opinion received for PCT Patent Application No. PCT/US21/18270, dated Jun. 2, 2021, 14 pages.

* cited by examiner

*Primary Examiner* — Hannah J Pak
(74) *Attorney, Agent, or Firm* — Faegre Drinker Biddle & Reath LLP

(57) ABSTRACT

The present disclosure provides a masterbatch polyamide polymer capable of conferring stain resistance to a terminated polyamide polymer while substantially maintaining the processability of the terminated polyamide polymer.

17 Claims, 1 Drawing Sheet

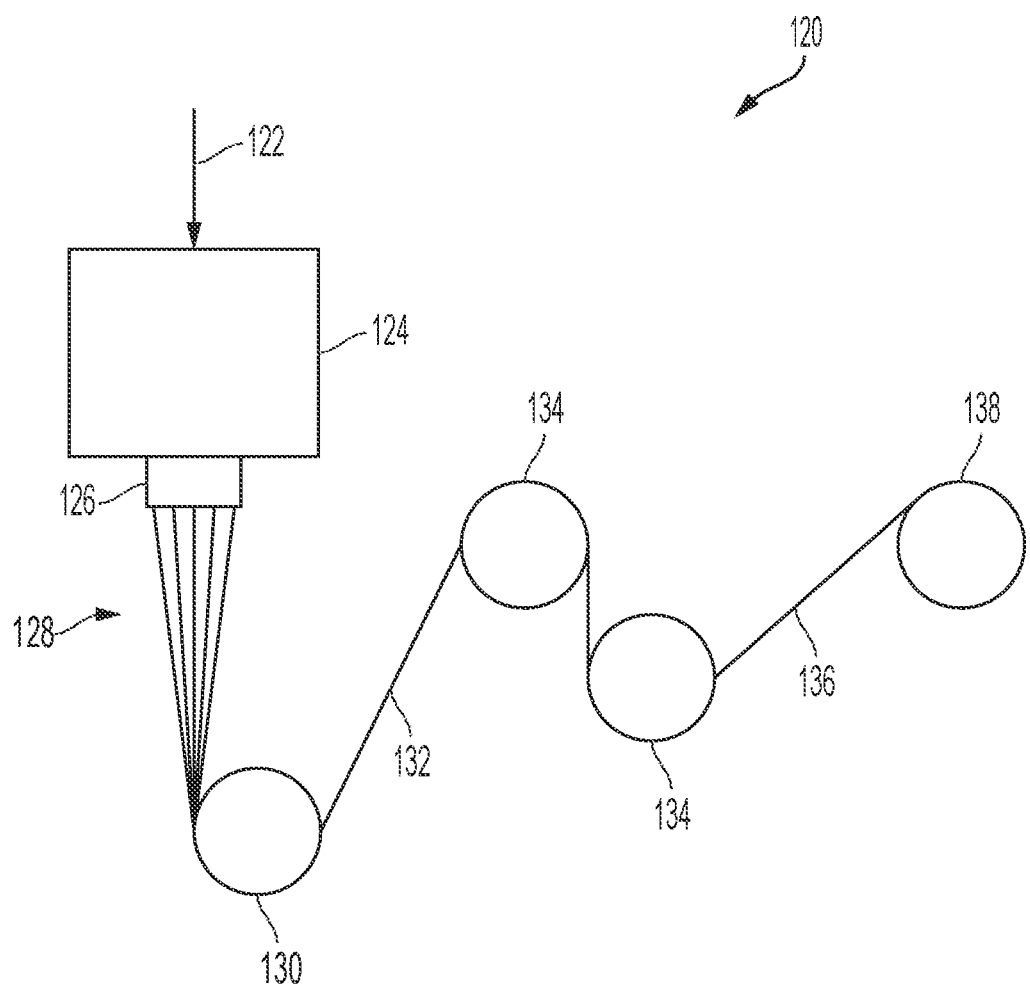

POLYAMIDE-BASED MASTERBATCH FORMULATION

CROSS-REFERENCE TO RELATED APPLICATION

This application claims priority to Provisional Application No. 62/977,868, filed Feb. 18, 2020, which is herein incorporated by reference in its entirety.

FIELD

The present disclosure provides polyamide compositions. In particular, the present disclosure provides polyamide blends having desirable processability and stain resistance.

BACKGROUND

Typical polyamide-6 polymers are polymerized with mono-termination using a difunctional acid which reacts with, and therefore terminates, some of the amine end groups. U.S. Pat. No. 10,494,740 entitled DUAL-TERMINATED POLYAMIDE FOR HIGH SPEED SPINNING APPLICATION, discloses dual termination of polyamide polymers intended for high-speed fiber spinning applications. The '740 patent discloses using both a monofunctional base and a monofunctional acid to terminate some of the carboxylic acid end groups and some of the amine end groups. The dual-termination provides for a more thermally stable polyamide polymer that can be spun to produce fibers at higher speeds than with mono-terminated polyamide polymers. U.S. Patent application 62/836,813 entitled STAIN RESISTANT POLYAMIDE POLYMERS OBTAINED VIA HIGH END GROUP TERMINATION, discloses highly dual-terminated polyamide polymers in which the high-degree of termination confers stain resistance to polyamide polymers intended for high-speed fiber spinning applications.

As noted in the '813 application, the addition of a polyester-based stain resistance masterbatch to non-terminated polyamide and highly dual-terminated polyamide markedly reduced fiber spinning processability of both resins. What is needed is a polyamide composition with both additional stain resistance and excellent spinning processability.

SUMMARY

The present disclosure provides a masterbatch polyamide polymer capable of conferring stain resistance to a terminated polyamide polymer while substantially maintaining the processability of the terminated polyamide polymer.

In one form thereof, the present disclosure provides a masterbatch polyamide polymer including a residue of caprolactam, a residue of a diamine, and a residue of at least one of 5-sulfoisophthalic acid and a 5-sulfoisophthalic acid salt. The masterbatch polyamide polymer is capable of conferring stain resistance to a terminated polyamide polymer while substantially maintaining the processability of the terminated polyamide polymer.

The residue of at least one of 5-sulfoisophthalic acid and the 5-sulfoisophthalic acid salt may be selected from the group consisting of sodium 5-sulfoisophthalate, lithium 5-sulfoisophthalate, potassium 5-sulfoisophthalate and combinations thereof. A concentration of the residue of the at least one of 5-sulfoisophthalic acid and the 5-sulfoisophthalic acid salt may be from 0.5 wt. % to 20 wt. % based on a total weight of the masterbatch polyamide polymer. A concentration of the residue of the at least one of 5-sulfoisophthalic acid and the 5-sulfoisophthalic acid salt may be from 7 wt. % to 20 wt. % based on a total weight of the masterbatch polyamide polymer. A concentration of the residue of the at least one of 5-sulfoisophthalic acid and the 5-sulfoisophthalic acid salt may be from 4 wt. % to 10 wt. % based on a total weight of the masterbatch polyamide polymer. The residue of the diamine may include a residue of hexamethylenediamine.

The masterbatch polyamide polymer may further include a residue of a monofunctional acid. The residue of the monofunctional acid may include a residue of at least one of acetic acid, propionic acid, benzoic acid, stearic acid and terephthalic acid. The terminated polyamide polymer may have a total termination from 20% to 90%.

In another form thereof, the present disclosure provides for a method of making a masterbatch polyamide polymer. The method includes providing caprolactam, a diamine and at least one of 5-sulfoisophthalic acid and a 5-sulfoisophthalic acid salt to a reactor, mixing the caprolactam, the diamine and the at least one of the 5-sulfoisophthalic acid and the 5-sulfoisophthalic acid salt together in the reactor, and reacting the caprolactam, the diamine and the at least one of the 5-sulfoisophthalic acid and the 5-sulfoisophthalic acid salt within the reactor at a reaction temperature.

In the providing step, the at least one of the 5-sulfoisophthalic acid and the 5-sulfoisophthalic acid salt may be from 0.5 wt. % to 20 wt. % based on a total weight of the polyamide composition. In the providing step, the at least one of the 5-sulfoisophthalic acid and the 5-sulfoisophthalic acid salt may be from 7 wt. % to 20 wt. % based on a total weight of the polyamide composition. In the providing step, the at least one of the 5-sulfoisophthalic acid and the 5-sulfoisophthalic acid salt may be from 4 wt. % to 10 wt. % based on a total weight of the polyamide composition. In the providing step, the at least one of the 5-sulfoisophthalic acid and the 5-sulfoisophthalic acid salt may be selected from the group consisting of: sodium 5-sulfoisophthalate, lithium 5-sulfoisophthalate, potassium 5-sulfoisophthalate and combinations thereof. In the providing step, the diamine may include hexamethylenediamine.

In the reacting step, the reactor may be pressurized for a portion of the reacting step. In the reacting step, the reaction temperature may be from about 225° C. to about 290° C.

In another form thereof, the present disclosure provides for a polyamide polymer blend including a master batch polyamide and a terminated polyamide polymer. The masterbatch polyamide polymer includes a residue of caprolactam, a residue of a diamine, and a residue of at least one of 5-sulfoisophthalic acid and a 5-sulfoisophthalic acid salt. The masterbatch polyamide polymer is capable of conferring stain resistance to the terminated polyamide polymer while substantially maintaining the processability of the terminated polyamide polymer.

The masterbatch polyamide polymer may be between 5 wt. % and 25 wt. % of the total weight of the polyamide polymer blend.

A concentration of the residue of the at least one of 5-sulfoisophthalic acid and the 5-sulfoisophthalic acid salt may be from 0.8 wt. % to 1.2 wt. % based on a total weight of the polyamide polymer blend. The at least one of the 5-sulfoisophthalic acid and the 5-sulfoisophthalic acid salt may be selected from the group consisting of: sodium 5-sulfoisophthalate, lithium 5-sulfoisophthalate, potassium 5-sulfoisophthalate and combinations thereof.

The terminated polyamide polymer may have an amine end group concentration from 25 millimoles per kilogram to 40 millimoles per kilogram and a carboxyl end group concentration from 18 millimoles per kilogram to 50 millimoles per kilogram. The terminated polyamide polymer may have an amine end group concentration of less than 25 millimoles per kilogram and a carboxyl end group concentration of less than 18 millimoles per kilogram. The terminated polyamide polymer may have a total termination from 20% to 90%.

The polyamide polymer blend may have a formic acid viscosity from about 30 FAV to about 100 FAV, as measured by ASTM D-789-07. A color difference ΔE of the polyamide polymer blend may be less than 10, per CIE DE2000. The terminated polyamide polymer may be a polyamide-6 polymer.

In another form thereof, the present disclosure provides for a method of producing a polyamide polymer blend. The method includes providing a masterbatch polyamide polymer, providing a terminated polyamide polymer, and combining the masterbatch polyamide polymer and the terminated polyamide polymer to produce the polyamide polymer blend. The masterbatch polyamide polymer includes a residue of caprolactam, a residue of a diamine, and a residue of at least one of 5-sulfoisophthalic acid and a 5-sulfoisophthalic acid salt.

The masterbatch polyamide polymer may be provided in an amount between 5 wt. % and 25 wt. % of the total weight of the polyamide polymer blend. A concentration of the residue of the at least one of the 5-sulfoisophthalic acid and the 5-sulfoisophthalic acid salt may be from 0.8 wt. % to 1.2 wt. % based on a total weight of the polyamide polymer blend. The at least one of the 5-sulfoisophthalic acid and the 5-sulfoisophthalic acid salt may be selected from the group consisting of: sodium 5-sulfoisophthalate, lithium 5-sulfoisophthalate, potassium 5-sulfoisophthalate and combinations thereof.

The terminated polyamide polymer may have an amine end group concentration from 25 millimoles per kilogram to 40 millimoles per kilogram and a carboxyl end group concentration from 18 millimoles per kilogram to 50 millimoles per kilogram. The terminated polyamide polymer may have an amine end group concentration of less than 25 millimoles per kilogram and a carboxyl end group concentration of less than 18 millimoles per kilogram. The terminated polyamide polymer may have a total termination from 20% to 90%.

A formic acid viscosity of the polyamide polymer blend may be from about 30 FAV to about 100 FAV, as measured by ASTM D-789-07. A color difference ΔE of the polyamide polymer blend may be less than 10 per CIE DE2000.

The above mentioned and other features of the invention, and the manner of attaining them, will become more apparent and the invention itself will be better understood by reference to the following description.

BRIEF DESCRIPTION OF THE DRAWINGS

The FIGURE is an example of a system for extrusion, spinning, and drawing fibers or filaments.

DETAILED DESCRIPTION

The present disclosure provides stain resistant, highly terminated polyamide blends with excellent fiber spinning processability. Polyamides may be formed from precursors such as caprolactam via hydrolysis, polyaddition, and polycondensation reactions. When these materials are formed from caprolactam, the lactam ring is opened to form two end groups: one amine and one carboxylic acid or carboxylate. Polyaddition combines the lactam monomers into intermediate molecular weight oligomers, and polycondensation combines oligomers into higher molecular weight polymers.

Although the disclosures herein describe polyamide-6 (PA-6) polymer blends, the disclosure is not intended to be limited to only PA-6 polymers. Polymer blends, fibers and filaments according to the present disclosure may also be formed from other polyamide polymers, including, for example, polyamide-6,6 (PA-66), polyamide-666 (PA-666), polyamide-46 (PA-46), polyamide-610 (PA-610), polyamide-1212 (PA-1212), and mixtures and copolymers thereof.

Although not so limited, the polyamide polymer blends described herein are particularly useful in forming stain resistant polymers for color pigmented fiber applications for carpet and textile applications, for example.

It has been surprisingly found that combining a terminated polyamide polymer and a masterbatch polyamide polymer incorporating 5-sulfoisophthalic acid or a 5-sulfoisophthalic acid salt produces a polyamide polymer blend with excellent spinning processability and excellent stain resistance. As is known in the art, a miscible polymer blend is a homogeneous mixture of two or more distinct polymers. The two or more distinct polymers retain their chemical structures after blending. A masterbatch is a material containing a concentrated level of a functional additive. A small amount of the masterbatch can be conveniently blended with another material to provide the functional additive to the blend at a lower, but well-controlled, concentration. Thus, the masterbatch polyamide polymer of the present disclosure may be blended with a terminated polyamide polymer to conveniently provide the 5-sulfoisophthalic acid to the polyamide polymer blend at a lower concentration.

The masterbatch polyamide polymer provided by the present disclosure for use in the polyamide polymer blend may be formed from caprolactam, one or more diamines, a 5-sulfoisophthalic acid salt or 5-sulfoisophthalic acid and, optionally, a monofunctional acid. Thus, the resulting masterbatch polyamide polymer includes a residue of the caprolactam, a residue of the diamine, a residue of the 5-sulfoisophthalic acid salt or 5-sulfoisophthalic acid and, optionally, a residue of the monofunctional acid as the residues make up the masterbatch polyamide polymer.

The caprolactam (also called hexano-6-lactam, azepan-2-one, and ε-caprolactam) is shown below:

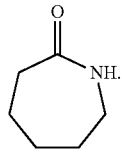

Formula I

The diamine can be a C4-C6 straight or branched diamine, for example. The diamine can include hexamethylenediamine available from Sigma-Aldrich Corp, St. Louis, Mo., for example.

The masterbatch polyamide polymer can include the residue of the diamine in an amount as low as 0.5 wt. %, 0.6 wt. %, 0.8 wt. %, 1 wt. %, 1.2 wt. %, 1.5 wt. %, 2 wt. %, 2.5 wt. %, or 3 wt. %, or as high as 3.5 wt. %, 4 wt. %, 5 wt. %, 6 wt. %, 8 wt. %, 10 wt. %, 15 wt. % or 20 wt. %, or within any range defined between any two of the foregoing values, such as 0.5 wt. % to 20 wt. %, 0.6 wt. % to 15 wt. %, 0.8 wt. % to 10 wt. %, 1 wt. % to 8 wt. %, 1.2 wt. % to 6 wt. %, 1.5 wt. % to 5 wt. %, 2 wt. % to 4 wt. %, 2.5 wt. % to 3.5 wt. %, 1 wt. % to 3 wt. %, 2 wt. % to 6 wt. %, or 5 wt. % to 15 wt. %, for example.

The salt of 5-sulfoisophthalic acid can be lithium 5-sulfoisophthalate, sodium 5-sulfoisophthalate, potassium 5-sulfoisophthalate, or a combination thereof. The lithium 5-sulfoisophthalate is shown below:

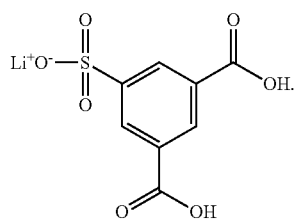

Formula II

The sodium 5-sulfoisophthalate is shown below:

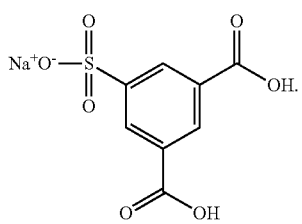

Formula III

The potassium 5-sulfoisophthalate is shown below:

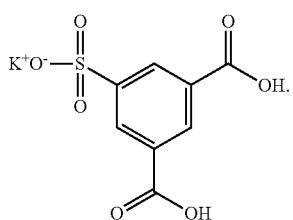

Formula IV

The masterbatch polyamide polymer can include the residue of the 5-sulfoisophthalic acid salt or 5-sulfoisophthalic acid in an amount as low as 0.5 wt. %, 0.6 wt. %, 0.8 wt. %, 1 wt. %, 1.2 wt. %, 1.5 wt. %, 2 wt. %, 2.5 wt. %, 3 wt. %, 3.5 wt. %, 4 wt. %, or 5 wt. %, or as high as 6 wt. %, 7 wt. %, 8 wt. %, 9 wt. %, 10 wt. %, 12 wt. %, 15 wt. % or 20 wt. %, or within any range defined between any two of the foregoing values, such as 0.5 wt. % to 20 wt. %, 0.6 wt. % to 15 wt. %, 0.8 wt. % to 10 wt. %, 1 wt. % to 8 wt. %, 1.2 wt. % to 6 wt. %, 1.5 wt. % to 5 wt. %, 2 wt. % to 4 wt. %, 2.5 wt. % to 3.5 wt. %, 1 wt. % to 3 wt. %, 2 wt. % to 6 wt. %, 2 wt. % to 12 wt. %, 5 wt. % to 9 wt. %, 7 wt. % to 20 wt. %, 4 wt. % to 10 wt. % or 5 wt. % to 15 wt. %, for example. All weight percentages recited herein with respect to the masterbatch polyamide polymer are based on the total weight of the masterbatch polyamide polymer.

Optionally, the masterbatch polyamide polymer may further include a monofunctional acid as a terminating agent. The monofunctional acid can be acetic acid, propionic acid, benzoic acid, stearic acid, terephthalic acid, or any combination thereof. The monofunctional acid can consist of one of acetic acid, propionic acid, benzoic acid, stearic acid or terephthalic acid.

The masterbatch polyamide polymer can optionally include the residue of the monofunctional acid in an amount as low as 0.5 wt. %, 0.6 wt. %, 0.8 wt. %, 1 wt. %, 1.2 wt. %, 1.5 wt. %, 2 wt. %, 2.5 wt. %, or 3 wt. %, or as high as 3.5 wt. %, 4 wt. %, 5 wt. %, 6 wt. %, 8 wt. %, 10 wt. %, 15 wt. % or 20 wt. %, or within any range defined between any two of the foregoing values, such as 0.5 wt. % to 20 wt. %, 0.6 wt. % to 15 wt. %, 0.8 wt. % to 10 wt. %, 1 wt. % to 8 wt. %, 1.2 wt. % to 6 wt. %, 1.5 wt. % to 5 wt. %, 2 wt. % to 4 wt. %, 2.5 wt. % to 3.5 wt. %, 1 wt. % to 3 wt. %, 2 wt. % to 6 wt. %, or 5 wt. % to 15 wt. %, for example.

The masterbatch polyamide polymer may have a low moisture level as measured by ASTM D-6869. The moisture level may be less than about 2,000 ppm, less than about 1,500 ppm, less than about 1,200 ppm, less than about 1,000 ppm, less than about 800 ppm, less than about 600 ppm, less than about 500 ppm, or less than about 400 ppm, or less than a moisture content within any range defined between any two of the foregoing values.

The masterbatch polyamide polymer can be synthesized by providing caprolactam, a diamine, water, a 5-sulfoisophthalic acid salt or 5-sulfoisophthalic acid and, optionally, a monofunctional acid to a reactor, mixing the caprolactam, the diamine, the water, the 5-sulfoisophthalic acid salt or 5-sulfoisophthalic acid and, optionally, the monofunctional acid together in the reactor, and reacting the caprolactam, the diamine, the water, the 5-sulfoisophthalic acid salt or 5-sulfoisophthalic acid and, optionally, the monofunctional acid within the reactor at a reaction temperature. The diamine may be provided in an aqueous solution. The reactor may be under a reaction pressure during at least a portion of the reacting step. The mixing may continue during at least a portion of the reacting step.

The reaction temperature may be as low as about 225° C., about 230° C., about 235° C., about 240° C., or about 245° C., or as high as about 250° C., about 255° C., about 260° C., about 270° C., about 280° C., about 290° C., or within any range defined between any two of the foregoing values, such as about 225° C. to about 290° C., about 230° C. to about 280° C., about 235° C. to about 270° C., about 230° C. to about 260° C., about 260° C. to about 280° C., about 230° C. to about 240° C., or about 260° C. to about 270° C., for example.

In the providing step, a condensation catalyst may be provided. Suitable condensation catalysts include hypophosphorous acid salt or sodium hypophosphite, for example. The condensation catalyst may be provided at a concentration as low as about 50 ppm, about 100 ppm or about 150 ppm, or as high as about 200 ppm, about 250 ppm or about 300 ppm, or within any range defined between any two of the foregoing values, such as about 50 ppm to about 300 ppm, 100 ppm to about 250 ppm, 150 ppm to about 200 ppm, or about 150 ppm to about 250 ppm, for example.

The masterbatch polyamide polymer can be pelletized to form chips of the masterbatch polyamide polymer. The chips may be leached in deionized water to remove any unreacted caprolactam and then dried under vacuum to remove most of the water.

The terminated polyamide polymer for use with in the polyamide polymer blend of the disclosure may include a mono-terminated polyamide polymer and/or a dual-terminated polyamide polymer. The mono-terminated polyamide polymer may include a residue of a carboxyl end group terminating agent or a residue of an amine end group terminating agent in addition to residues of the monomeric materials used to form the particular polyamide making up the dual-terminated polyamide polymer, such as caprolactam for polyamide-6, or hexamethylene diamine and adipic acid for polyamide-6,6, for example.

Amine end group terminating agents can include monofunctional acidic terminators, such as acetic acid, propionic acid, benzoic acid, stearic acid, and/or terephthalic acid, for example. Carboxyl end group terminating agents can include monofunctional amines, such as cyclohexylamine, benzylamine and polyether amines, for example. Increased levels of end group terminating agents lower the concentrations of reactive amine and/or carboxyl end groups.

The mono-terminated polyamide polymer may include the residue of the carboxyl end group terminating agent in an amount of as little as 0.01 wt. %, 0.05 wt. %, 0.10 wt. %, as great as 0.40 wt. %, 0.45 wt. %, 0.50 wt. %, or within any range defined between any two of the foregoing values, such as 0.01 wt. % to 0.5 wt. %, 0.05 wt. % to 0.45 wt. %, or 0.10 wt. % to 0.40 wt. %, for example.

The mono-terminated polyamide polymer may include the residue of amine end group terminating agent in an amount of as little as 0.20 wt. %, 0.25 wt. %, 0.30 wt. %, as great as 0.60 wt. %, 0.65 wt. %, 0.70 wt. %, or within any range defined between any two of the foregoing values, such as 0.20 wt. % to 0.80 wt. %, 0.25 wt. % to 0.65 wt. %, or 0.30 wt. % to 0.6 wt. %, for example. All weight percentages recited herein with respect to the terminated polyamide polymer are based on the total weight of the terminated polyamide polymer, not including additional additives.

The dual-terminated polyamide polymer for use with in the polyamide polymer blend of the disclosure may include a residue of a carboxyl end group terminating agent and residue of an amine end group terminating agent in addition to residues of the monomeric materials used to form the particular polyamide making up the dual-terminated polyamide polymer, such as caprolactam for polyamide-6, or hexamethylene diamine and adipic acid for polyamide-6,6, for example.

Amine end group terminating agents can include monofunctional acidic terminators, such as acetic acid, propionic acid, benzoic acid, stearic acid, and/or terephthalic acid, for example. Carboxyl end group terminating agents can include monofunctional amines, such as cyclohexylamine, benzylamine and polyether amines, for example. Increased levels of end group terminating agents lower the concentrations of reactive amine and/or carboxyl end groups.

The dual-terminated polyamide polymer may include the residue of the carboxyl end group terminating agent in an amount of as little as 0.01 wt. %, 0.05 wt. %, 0.10 wt. %, 0.20 wt. %, or 0.30 wt. % as great as 0.40 wt. %, 0.50 wt. %, 0.60 wt. %, 0.80 wt. %, or 1 wt. %, or within any range defined between any two of the foregoing values, such as 0.01 wt. % to 1 wt. %, 0.05 wt. % to 0.80 wt. %, 0.10 wt. % to 0.60 wt. %, 0.20 wt. % to 0.50 wt. % or 0.30 wt. % to 0.40 wt. %, for example.

The dual-terminated polyamide polymer may include the residue of amine end group terminating agent in an amount of as little as 0.20 wt. %, 0.25 wt. %, 0.30 wt. % or 0.40 wt. %, or as great as 0.50 wt. %, 0.60 wt. %, 0.65 wt. %, 0.70 wt. %, or 1 wt. %, or within any range defined between any two of the foregoing values, such as 0.20 wt. % to 1 wt. %, 0.25 wt. % to 0.70 wt. %, 0.30 wt. % to 0.65 wt. %, 0.40 wt. % to 0.60 wt. %, 0.50 wt. % to 1 wt. % or 0.40 wt. % to 0.7 wt. %, for example.

The terminated polyamide polymer may have a low moisture level as measured by ASTM D-6869. The moisture level may be less than about 2,000 ppm, less than about 1,500 ppm, less than about 1,200 ppm, less than about 1,000 ppm, less than about 800 ppm, less than about 600 ppm, less than about 500 ppm, or less than about 400 ppm, or less than a moisture content within any range defined between any two of the foregoing values.

The terminated polyamide polymer can be synthesized by providing caprolactam, water, an amine end group terminating agent and/or a carboxyl end group terminating agent to a reactor, mixing the caprolactam, the water, the amine end group terminating agent and/or the carboxyl end group terminating agent together in the reactor, and reacting the caprolactam, the water, the amine end group terminating agent and/or the carboxyl end group terminating agent within the reactor at a reaction temperature. The reactor may be under a reaction pressure during at least a portion of the reacting step. A vacuum may be applied to the reactor to remove water generated during the reacting step. The mixing may continue during at least a portion of the reacting step.

The reaction temperature may be as low as about 225° C., about 230° C., about 235° C., about 240° C., or about 245° C., or as high as about 250° C., about 255° C., about 260° C., about 270° C., about 280° C., about 290° C., or within any range defined between any two of the foregoing values, such as about 225° C. to about 290° C., about 230° C. to about 280° C., about 235° C. to about 270° C., about 230° C. to about 260° C., about 260° C. to about 280° C., about 230° C. to about 240° C., or about 260° C. to about 270° C., for example.

In the providing step, a condensation catalyst may be provided. Suitable condensation catalysts include hypophosphorous acid salt or sodium hypophosphite, for example. The condensation catalyst may be provided at a concentration as low as about 50 ppm, about 100 ppm or about 150 ppm, or as high as about 200 ppm, about 250 ppm, or about 300 ppm, or within any range defined between any two of the foregoing values, such as about 50 ppm to about 300 ppm, 100 ppm to about 250 ppm, 150 ppm to about 200 ppm, about 50 ppm to about 150 ppm, or 150 ppm to about 250 ppm, for example.

The terminated polyamide polymer can be pelletized to form chips of the terminated polyamide polymer. The chips may be leached in deionized water to remove any unreacted caprolactam and then dried under vacuum to remove most of the water.

The polyamide polymer blends provided by the present disclosure can include the masterbatch polyamide polymer in an amount as low as low as 5 wt. %, 6 wt. %, 7 wt. %, 8 wt. %, 9 wt. % or 10 wt. %, or as high as 12 wt. %, 14 wt. %, 16 wt. %, 18 wt. %, 20 wt. %, 22 wt. % or 25 wt. %, or within any range defined between any two of the foregoing values, such as 5 wt. % to 25 wt. %, 6 wt. % to 22 wt. %, 7 wt. % to 20 wt. %, 8 wt. % to 18 wt. %, 9 wt. % to 15 wt. %, 10 wt. % to 12 wt. %, 10 wt. % to 20 wt. %, 10 wt. % to 16 wt. %, 5 wt. % to 10 wt. %, or 12 wt. % to 20 wt. %, for example. All weight percentages recited herein with respect to the polyamide polymer blends are based on the total weight of the terminated polyamide polymer and the masterbatch polyamide polymer, but not including additional additives.

The polyamide polymer blends provided by the present disclosure can include the residue of the 5-sulfoisophthalic acid salt or 5-sulfoisophthalic acid in an amount as low as 0.8 wt. %, 0.85 wt. %, 0.9 wt. %, 0.95 wt. % or 1 wt. %, or as high as 1.05 wt. %, 1.1 wt. %, 1.15 wt. % or 1.2 wt. %, or within any range defined between any two of the foregoing values, such as 0.8 wt. % to 1.2 wt. %, 0.85 wt. % to 1.15 wt. %, 0.9 wt. % to 1.1 wt. %, 1 wt. % to 1.05 wt. %, or 0.95 wt. % to 1.05 wt. %, for example The polyamide polymer blend can also include some remaining amine end groups and carboxyl end groups that are not terminated by the end group terminating agents of the terminated polyamide polymer.

The amine end group concentration (AEG) may be determined by the amount of hydrochloric acid (HCl standardized, 0.1N) required to titrate a sample of the polyamide composition in solvent of 70% phenol and 30% methanol according to Equation 1 below:

$$AEG = \frac{(\text{mL HCl to titrate sample} - \text{mL HCl to titrate blank}) \times (\text{Normality HCl}) \times 1000}{\text{sample weight in grams}} \quad \text{Equation 1}$$

For example, the polyamide polymer blend may have an amine end group concentration as low as 20 mmol/kg, 22 mmol/kg, 24 mmol/kg, 26 mmol/kg, 28 mmol/kg or 30 mmol/kg, or as high as 32 mmol/kg, 34 mmol/kg, 36 mmol/kg, 38 mmol/kg or 40 mmol/kg, or within any range defined between any two of the foregoing values, such as 20 mmol/kg to 40 mmol/kg, 22 mmol/kg to 38 mmol/kg, 24 mmol/kg to 36 mmol/kg, 26 mmol/kg to 34 mmol/kg, 28 mmol/kg to 32 mmol/kg, 20 mmol/kg to 30 mmol/kg or 20 mmol/kg to 24 mmol/kg, for example. Alternatively, the polyamide polymer blend may be formed from a highly terminated polyamide polymer and may have an amine end group concentration of less than less than 20 mmol/kg, less than 18 mmol/kg, less than 10 mmol/kg, less than 8 mmol/kg, less than 7 mmol/kg or less than 5 mmol/kg, or have an amine end group concentration that is within any range defined between any two of the foregoing values, such between 5 mmol/kg and 20 mmol/kg, between 7 mmol/kg and 18 mmol/kg, or between 8 mmol/kg and 10 mmol/kg, for example.

The carboxyl end group (CEG) concentration can be determined by the amount of potassium hydroxide (KOH) needed to titrate a sample of the polyamide in benzyl alcohol according to the Equation 2 below:

$$CEG = \frac{(\text{mL KOH to titrate sample} - \text{mL KOH to titrate blank}) \times (\text{Normality KOH}) \times 1000}{\text{sample weight in grams}} \quad \text{Equation 2}$$

For example, the polyamide polymer blend may have a carboxyl end group concentration as low as 20 mmol/kg, 22 mmol/kg, 24 mmol/kg, 26 mmol/kg, 28 mmol/kg or 30 mmol/kg, or as high as 32 mmol/kg, 34 mmol/kg, 36 mmol/kg, 38 mmol/kg or 40 mmol/kg, or within any range defined between any two of the foregoing values, such as 20 mmol/kg to 40 mmol/kg, 22 mmol/kg to 38 mmol/kg, 24 mmol/kg to 36 mmol/kg, 26 mmol/kg to 34 mmol/kg, 28 mmol/kg to 32 mmol/kg, 20 mmol/kg to 30 mmol/kg or 20 mmol/kg to 24 mmol/kg, for example. Alternatively, the polyamide polymer blend may be formed from a highly terminated polyamide polymer and may have a carboxyl end group concentration of less than 20 mmol/kg, less than 18 mmol/kg, less than 16 mmol/kg, less than 14 mmol/kg, less than 10 mmol/kg, less than 8 mmol/kg, less than 7 mmol/kg or less than 5 mmol/kg, or have a carboxyl end group concentration that is within any range defined between any two of the foregoing values, such between 5 mmol/kg and 20 mmol/kg, between 7 mmol/kg and 18 mmol/kg, or between 8 mmol/kg and 16 mmol/kg, for example.

Another way to measure levels of termination in a linear polymer is by the degree of termination. The degree of termination of the polyamide polymer blend can be determined using the following Equations:

$$\text{Total termination \%} = \left[ \frac{\text{Equilibrium NH2+COOH end for } FAV \text{ level} - \text{Terminated NH2+COOH ends}}{\text{Equilibrium NH2+COOH ends for } FAV \text{ level}} \right] \times 100\% \quad \text{Equation 3}$$

$$\text{NH2 termination \%} = \left[ \frac{\text{Equilibrium NH2 ends for } FAV \text{ level} - \text{Terminated NH2 ends}}{\text{Equilibrium NH2 ends for } FAV \text{ level}} \right] \times 100\% \quad \text{Equation 4}$$

$$\text{COOH termination \%} = \left[ \frac{\text{Equilibrium COOH ends for } FAV \text{ level} - \text{Terminated COOH ends}}{\text{Equilibrium COOH ends for } FAV \text{ level}} \right] \times 100\% \quad \text{Equation 5}$$

A polyamide polymer blend can have a total termination % of as low as 20%, 25%, 30%, 35%, 40%, 45%, or 50%, or as high as 55%, 60%, 65%, 70%, 75%, 80%, 85% or 95%, or within any range defined between any two of the foregoing values, such as 20% to 90%, 25% to 85%, 30% to 80%, 35% to 75%, 40% to 70%, 45% to 65%, 50% to 60%, 55% to 60% or 20% to 60%, for example.

The polyamide polymer blend may have a relative viscosity (RV) as low as about 2.0 RV, about 2.5 RV, about 3.0 RV, about 3.5 RV, about 4.0 RV, about 4.5 RV, or as high as about 5.0 RV, about 5.5 RV, about 6.0 RV, about 6.5 RV, about 7.0 RV, or within any range defined between any two of the foregoing values, such as about 2.0 RV to about 7.0 RV, about 2.5 RV to about 6.5 RV, about 3.0 RV to about 6.0 RV, about 3.5 RV to about 5.5 RV, about 4.0 RV to about 5.0 RV, about 4.5 RV to about 5.0 RV, about 2.0 RV to about 4.5 RV or about 5.0 RV to about 7.0 RV, for example. All relative viscosity measurements herein are as measured by GB/T 12006.1-2009/ISO 307:2007.

The polyamide polymer blend may have a formic acid viscosity (FAV) as low as about 30 FAV, about 25 FAV, about 40 FAV, about 45 FAV, about 50 FAV, about 55 FAV, or about 60 or as high as about 65 FAV, about 70 FAV, about 75 FAV, about 80 FAV, about 85 FAV, about 90 FAV, about 95 FAV, or about 100 FAV, or within any range defined between any two of the foregoing values, such as about 30 FAV to about 100 FAV, about 35 FAV to about 95 FAV, about 40 FAV to about 90 FAV, about 45 FAV to about 85 FAV, about 50 FAV to about 80 FAV, about 55 FAV to about 75 FAV, about 60 FAV to about 70 FAV, about 55 FAV to about 65 FAV, about 50 FAV to about 70 FAV, about 40 FAV to about 60 FAV or about 55 FAV to about 75 FAV, for example. All FAV measurements herein are as measured by ASTM D-789-07.

The polyamide polymer blend has been shown to display excellent stain resistance characteristics. Common stains, such as coffee, wine, and food coloring, are acidic in nature. These materials may stain nylon (polyamide) fibers by binding to the terminal basic amine groups in the nylon polymers. Negatively charged groups in the polymers may help repel acidic materials, rendering the fibers stain resistant. Without being bound by theory, it is believed that the residue of the 5-sulfoisophthalic acid salt or 5-sulfoisophthalic acid increases stain resistance by increasing the negative charge on of the polymer composition.

One measurement of stain resistance is the total color difference ΔE. ΔE is a measurement of change in visual perception of a stained sample compared to a standard color sample, per CIE DE2000. A ΔE value of 0 means there is no measurable difference between the stained sample and the standard color sample. A ΔE value of around 2 is generally considered to be the smallest color difference perceptible by the human eye.

The ΔE of the polyamide composition may be less than 10, less than 9, less than 8, less than 7, less than 6, less than 5, less than 4, less than 3 or less than 2, or less than any value within any range defined between any two of the foregoing values.

Polyamide polymer blends can be formed by combining the masterbatch polyamide polymer as described above with the terminated polyamide polymer as described above. The polyamide polymer blend may be produced by melting the masterbatch polyamide polymer, melting the terminated polyamide polymer, and mixing together the masterbatch polyamide polymer and the terminated polyamide polymer. Alternatively, or additionally, the polyamide polymer blend may be produced by mixing together chips of the masterbatch polyamide polymer and chips of the terminated polyamide polymer, and then melting the mixture of chips. The melting may include additional mixing. That is, the chips may be mixed together prior to melting, and the melted mixture may be mixed to provide for a homogeneous blend.

The FIGURE is a schematic diagram showing a system and process 120 for forming fibers or filaments from the polyamide polymer blend disclosed herein. As illustratively shown in the FIGURE, the polyamide polymer blend is provided as a feed 122 to the hopper of an extruder 124, then melted in the extruder and pumped out through the spinneret 126 as fibers 128. The heated, polyamide polymer blend is spun using a spinneret 126, which may include one or more outlets for forming individual fibers 128 with a round or delta cross section. The individual fibers 128 may then be collected at 132 and drawn over one or more drawing rollers 134 before the resulting fibers 136 are collected in a wind-up bobbin 138 (as textiles and carpet fibers). Each fiber 136 may contain as few as 30, 32, 34, or as many as 56, 58, 60, filaments, or within any range defined between any two of the foregoing values, such as 30 to 60, 32 to 58, or 34 to 56 filaments, for example.

Although the FIGURE shows the feed 122 as a single feed of the polyamide polymer blend, it is understood that the feed 122 may alternatively, or additionally, include separate feeds of the masterbatch polyamide polymer and of the terminated polyamide polymer which are mixed together in the hopper of the extruder 124 to form the polyamide polymer blend, as described above.

Processability may be described using various measurements. Melt stability is an important measure of processability as it is necessary for the production of extruded fibers of uniform quality. As a polymer is held in an extruder and subsequently extruded, it is desirable that the properties of the polymer remain stable, as changes in properties, such as viscosity, can result in changes in the fiber produced. The polyamide polymer blend may be thermally stable as high as 255° C., 260° C., 265° C., 270° C., 272° C. or 275° C., or any temperature within any range defined between any two of the foregoing values, such as 255° C. to 275° C., 260° C. to 270° C. or 260° C. to 265° C., for example.

Fiber spinning performance, as described by the number of breaks in the fiber at a specific run speed, is another indicator of polymer processability, with fewer breaks at higher speeds being an important characteristic for efficient fiber manufacturing.

Tenacity and percent elongation are also important characteristics. The fiber 136 may have a tenacity as low as 4.0 grams per denier (gpd), 4.1 gpd, 4.2 gpd, 4.3, gpd, or 4.4 gpd, or as high as 4.5 gpd, 4.6 gpd, 4.7 gpd, or 4.8 gpd, or be within any range defined between any two of the foregoing values, such as 4.0 gpd to 4.8 gpd, 4.1 gpd, to 4.7 gpd, 4.2 gpd, to 4.6 gpd, 4.3 gpd to 4.5 gpd, 4.4 gpd to 4.8 gpd, 4.1 gpd to 4.4 gpd, 4.0 gpd to 4.5 gpd, or 4.4 gpd to 4.6 gpd, for example.

The fiber 136 may have an elongation of 30%, 40%, 50%, or even as much as 70%, 80%, 90%, or within any range defined between any two of the foregoing values, such as 30% to 90%, 40% to 80% 50% to 70%, 30% to 50% or 70% to 90%, for example.

The fiber 136 may have a total draw ratio (from spinneret 126 to wind-up bobbin 138) as little as 90×, 100×, 110×, as great as 230×, 240×, 250×, or within any range defined between any two of the foregoing values, such as 90× to 250×, 100× to 240×, or 110× to 230×.

The fiber 136 may have a total denier as low as 150, 165 or 180, or as high as 1400, 1450, 1500, or be within any range defined between any two of the foregoing values, such as 150 to 1500, 165 to 1450, or 180 to 1400 denier, for example. The denier per filament may be as low as 4, 5 or 6, or as high as 46, 48 or 50, or be within any range defined between any two of the foregoing values, such as between 4 and 10 denier for textile applications or between 22 and 28 denier for carpet applications, for example.

The polyamide polymer blend made by the methods described above may be extruded and spun to form the fiber 136 at high take up speeds, which allows for highly efficient manufacturing. The fiber 136 may be formed at take up speeds as low as 2,500 meters per minute (m/min), 3,000 m/min, 3,500 m/min or 4,000 m/min, or as high as 4,500 m/min, 5,000 m/min, 5,500 m/min or 6,000 m/min, or within any range defined between any two of the foregoing values, such as 2,500 m/min to 6,000 m/min, 3,000 m/min to 5,500 m/min, 3,500 m/min to 5,000 m/min, 4,000 m/min to 4,500 m/min, 5,000 m/min to 6,000 m/min, 2,500 m/min to 4,500 m/min, or 4,000 m/min to 6,000 m/min, for example.

While this invention has been described as relative to exemplary designs, the present invention may be further modified within the spirit and scope of this disclosure. Further, this application is intended to cover such departures from the present disclosure as come within known or customary practice in the art to which this invention pertains.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

EXAMPLES

Example 1: Preparation of a Masterbatch Polyamide Polymer Including a Residue of a 5-Sulfoisophthalic Acid Salt In this Example, the preparation of a masterbatch polyamide polymer including a reside of a 5-sulfoisophthalic acid salt is demonstrated. A solution was prepared by adding 300 grams of deionized water to a 2,000 mL glass beaker fitted with an agitator, heating the water to 50° C. and then adding 342 grams of lithium 5-sulfoisophthalate (Sigma-Aldrich Corp., St. Louis, Mo.) to the heated deionized water. The mixture was stirred as an additional 100 grams of deionized water was added to produce a clear solution. The temperature of the solution was increased and maintained at 70° C.-75° C. while 191 grams of a solution consisting essentially of 70 wt. % hexamethylenediamine and 30 wt. % water (Sigma-Aldrich Corp., St. Louis, Mo.) was added gradually while stirring to produce a solution of lithium 5-sulfoisophthalate salt and hexamethylenediamine salt. A reactor was prepared by fitting a 12 L stainless-steel vessel with a helical agitator. The 5,500 grams of caprolactam (AdvanSix Resins and Chemicals LLC, Parsippany, N.J.), the solution of lithium 5-sulfoisophthalate salt and hexamethylenediamine salt, and a condensation catalyst in the form of hypophosphorous acid salt were provided to the reactor. The condensation catalyst at a concentration of about 100 parts per million.

The reactor contents were mixed together in the reactor. The reactor was heated to a reaction temperature of about 230° C. and the reactants mixed for one hour. A reactor pressure of about 9 bars was observed. After the one hour, the reactor was vented to release the pressure. The reaction temperature was increased to about 260° C. and held for one hour while the reactor was swept with nitrogen (2 L/min) and the contents mixed with the helical agitator to allow the polyamide polymer to grow in molecular weight. After one hour, a vacuum of about 0.9 bar was applied and the contents mixed until the torque applied to the helical agitator reached a target torque value of about 28 Nm to produce a polyamide polymer. The polyamide polymer was extruded from the reactor in a single strand and into a water trough to cool. The cooled polyamide polymer was pelletized with a pelletizer to form chips of the polyamide polymer. The chips were leached three times at 120° C. at a pressure of about 15 psi for one hour in deionized water for a total time of three hours to remove unreacted caprolactam. The rinsed polyamide polymer was dried in a vacuum oven at 80° C. and a vacuum of 28 inches of mercury for three days to produce the masterbatch polyamide polymer with a moisture content of about 800 parts per million. The masterbatch polyamide polymer was determined to have about a 7 wt. % concentration of lithium 5-sulfoisophthalate. The concentration of the lithium 5-sulfoisophthalate was determined from the metal concentration in the polymer as measured by inductively coupled plasma (ICP) spectroscopy.

Example 2: Preparation of a Dual-Terminated Polyamide Polymer

In this Example, the preparation of a dual-terminated polyamide-6 polymer is demonstrated. A reactor was prepared by fitting a 12 L stainless-steel vessel with a helical agitator. The reactants provided to the reactor included 5,5000 grams caprolactam (AdvanSix Resins and Chemicals LLC, Parsippany, N.J.), 10 grams of acetic acid (Sigma-Aldrich Corp., St. Louis, Mo.), 14 grams of cyclohexyl amine (Sigma-Aldrich Corp., St. Louis, Mo.) and 100 grams of deionized water.

The reactants, the catalyst and the water were mixed together in the reactor. The reactor was heated to a reaction temperature of about 250° C. and the reactants mixed for one hour. A reactor pressure of about 3.5 bars was observed. After the one hour, the reactor was vented to release the pressure. The reaction temperature was increased to about 260° C. and held for one hour while the reactor was swept with nitrogen (2 L/min) and the contents mixed with the helical agitator to allow the polyamide polymer to grow in molecular weight. After one hour, a vacuum of about 0.9 bar was applied and the contents mixed until the torque applied to the helical agitator reached a target torque value of about 24 Nm to produce a dual-terminated polyamide polymer. The dual-terminated polyamide polymer was extruded from the reactor and into a water trough to cool. The cooled dual-terminated polyamide polymer was pelletized with a pelletizer to form chips of the dual-terminated polyamide polymer. The chips were leached three times at 120° C. at a gauge pressure of about 15 psi for one hour in deionized water for a total time of three hours to remove unreacted caprolactam. The rinsed dual-terminated polyamide polymer was dried in a vacuum oven at 80° C. and a vacuum of 28 inches of mercury for three days to produce the dual-terminated polyamide polymer with a moisture content of about 800 parts per million.

Example 3: Preparation of Polyamide Polymer Blends and Fibers

In this Example, the preparation of polyamide polymer blends and fibers is demonstrated. Several masterbatch polyamide polymers were prepared according to Example 1 above, except that amount of the 5-sulfoisophthalic acid salt (SIPA) in the masterbatch polyamide polymers was varied, as well as the salt itself, as shown in Table 1 below. Polyamide polymer blend Samples 1-3 were formed by mixing chips of the masterbatch polyamide polymers together with chips of the dual-terminated polyamide polymer in weight percentages shown in Table 1 and providing the mixture of chips to a single screw extruder (two-inch diameter screw, 27 to 1 L/D). The mixture of chips was heated and mixed in the extruder at a temperature ranging from 255° C. to 265° C. to form the polyamide polymer blend sample. Each of the polyamide polymer blend Samples 1-3 was characterized with respect to formic acid viscosity (FAV), amine end group concentration, and carboxyl end group concentration. The amine end group concentration and the carboxyl end group concentration were also measured for the dual-terminated polyamide polymer (DTPP) alone, as well as a commercially available nylon material containing 1 wt. % of 5-sulfoisophthalic acid for comparison (Commercial Sample). The total termination of each of Samples 1-3 and DTPP was 58-59%. The total termination of the Commercial Sample was 37%. The results are shown in Table 1.

TABLE 1

| Sample | Masterbatch SIPA Salt | Masterbatch SIPA (wt. %) | Masterbatch (wt. %) | Polyamide Polymer Blend SIPA (wt. %) | FAV | AEG (mmol/kg) | CEG (mmol/kg) |
|---|---|---|---|---|---|---|---|
| 1 | Li | 7 | 14 | 1.0 | 60.0 | 25.3 | 20 |
| 2 | Li | 10 | 10 | 1.0 | 60.3 | 25.8 | 20 |
| 3 | Na | 7 | 15 | 1.1 | 60.0 | 25.2 | 20 |
| DTPP | None | | | 0 | 61 | 27.0 | 20 |
| Commercial Sample | None | | | 1.0 | 60 | 24 | 55 |

Fibers were formed from the polyamide polymer blend Samples 1-3. The polyamide polymer blends were extruded at a rate of 15 pounds per hour, with an extruder pressure of 750 psig. Fibers were spun from each sample using a spinneret with thirty-six, 0.4 mm diameter capillaries. The fibers were drawn at take up speeds ranging from 3,000 meters per minute (mpm) to 6,000 mpm. For comparison purposes, fibers were also spun from the DTPP material alone and from the Commercial Sample material.

Example 4: Evaluation of Polyamide Polymer Blends and Fibers

Some of the polyamide polymer fibers of Example 3 were evaluated for processability as indicated by the number of broken filaments observed during five minutes of drawing for each of the samples at increasing spin speeds. The results are shown in Table 2.

The polyamide polymer fibers were also evaluated for stain resistance as indicated by the total color difference ΔE. A solution of 100 mg of FD&C Red 40 dye was dissolved in 200 mL of water, and citric acid added to achieve a pH of about 2.8. The polyamide polymer fibers were placed in the Red 40 dye solution for 30 seconds, and then rinsed with water. The stained fibers were placed in a vacuum oven at 90° C. for 24 hours to dry. Both stained and non-stained original samples were wound onto white cardboard cards and the color measured with a spectrophotometer (Konica Minolta CM-5 Spectrophotometer) to determine L, a and b values in the CIE L,a,b color space. Standard ΔE values were calculated based on the color measurements using Equation 6.

$$\Delta E = ((\Delta L^2) + (\Delta a^2) + (\Delta b^2))^{0.5}$$  Equation 6:

Standard ΔE measures color change from staining due to dye uptake. The results are shown in Table 2.

TABLE 2

| Sample | ΔE | Tenacity (gpd) | Spin Speed (mpm) 3,000 | 4,000 | 5,000 | 5,500 | 6,000 |
|---|---|---|---|---|---|---|---|
| 1 | 1.4 | 4.5 | 0 | 0 | 0 | 0 | 3 |
| 2 | 0.7 | 4.5 | 0 | 0 | 0 | 0 | 3 |
| 3 | 1.0 | 4.1 | 0 | 0 | 0 | 4 | 3 |
| DTPP | 21.9 | 4.8 | 0 | 0 | 0 | 0 | 0 |
| Commercial Sample | 1.2 | 3.9 | 0 | 1 | 4 | 10 | NA |

As shown in Table 2, the stain resistances of the Samples 1-3 are comparable to, or better than, the commercially available stain resistant polyamide-6 polymer. The dual-terminated polyamide polymer alone does not exhibit the excellent stain resistance of the Samples 1-3.

The tenacities of the Samples 1-3 are not quite as high as the dual-terminated polyamide polymer but are better than the commercially available stain resistant polyamide-6 polymer. This difference is further reflected in the number of broken filaments observed. The dual-terminated polyamide polymer shows excellent spinning performance, with no broken filaments at spinning speeds up to 6,000 mpm. The Samples 1 and 2 are nearly as excellent, with no broken filaments at spinning speeds up to 5,500 mpm and acceptable performance at 6,000 mpm. Sample 3 demonstrates good spinning performance with no broken filaments at spinning speeds up to 5,000 mpm. The commercially available stain resistant polyamide-6 polymer exhibits much worse spinning performance, with broken filaments at 4,000 mpm and a high number of broken filaments at 5,500 mpm. Thus, fibers made using polyamide polymer blends according to this disclosure demonstrate both excellent processability and excellent stain resistance.

Three polymer/polymer blends were evaluated for melt stability, the dual-terminated polyamide polymer (DTPP), the polyamide polymer blend of the masterbatch used for Sample 1 above and the DTPP, and a polyamide blend of the masterbatch used for Sample 1 and a mono-terminated polyamide polymer. Each of these three polymer/polymer blends was held at a temperature ranging from 260° C. to 265° C. for 32 minutes and viscosity measured periodically. The dual-terminated polyamide polymer and the polyamide polymer blend of the masterbatch and the dual-terminated polyamide polymer demonstrated virtually no change in viscosity over the 32 minutes, while the polymer blend of the masterbatch and the mono-terminated polyamide polymer exhibited an increase in viscosity of about 10%. Thus, some fibers made using polyamide polymer blends according to this disclosure also demonstrate excellent melt stability.

What is claimed is:

1. A masterbatch polyamide polymer comprising:
   a residue of caprolactam;
   a residue of a diamine; and
   a residue of at least one of 5-sulfoisophthalic acid and a 5-sulfoisophthalic acid salt,
   wherein a concentration of the residue of the at least one of 5-sulfoisophthalic acid and the 5-sulfoisophthalic acid salt is from 0.5 wt. % to 20 wt. % based on a total weight of the masterbatch polyamide polymer, and
   whereby the masterbatch polyamide polymer is capable of conferring stain resistance to a terminated polyamide polymer while maintaining the processability of the terminated polyamide polymer, wherein processability is defined by a melt stability within a range between 255° C. and 275° C.

2. The masterbatch polyamide polymer of claim 1, wherein the residue of at least one of 5-sulfoisophthalic acid and the 5-sulfoisophthalic acid salt is selected from the group consisting of sodium 5-sulfoisophthalate, lithium 5-sulfoisophthalate, potassium 5-sulfoisophthalate and combinations thereof.

3. The masterbatch polyamide polymer of claim 1, wherein the residue of the diamine includes a residue of hexamethylenediamine.

4. The masterbatch polyamide polymer of claim 1, wherein the masterbatch polyamide polymer further comprises a residue of a monofunctional acid, the residue of the monofunctional acid comprising a residue of at least one of acetic acid, propionic acid, benzoic acid, stearic acid and terephthalic acid.

5. The masterbatch polyamide polymer of claim 1, wherein the terminated polyamide polymer has a total termination from 20% to 90%.

6. A polyamide polymer blend comprising:
a terminated polyamide polymer; and
a masterbatch polyamide polymer comprising:
   a residue of caprolactam;
   a residue of a diamine; and
   a residue of at least one of 5-sulfoisophthalic acid and a 5-sulfoisophthalic acid salt,
   wherein a concentration of the residue of the at least one of 5-sulfoisophthalic acid and the 5-sulfoisophthalic acid salt is from 0.8 wt. % to 1.2 wt. % based on a total weight of the polyamide polymer blend, and
   whereby the masterbatch polyamide polymer is capable of conferring stain resistance to the terminated polyamide polymer while maintaining the processability of the terminated polyamide polymer, wherein processability is defined by a melt stability within a range between 255° C. and 275° C.

7. The polyamide polymer blend of claim 6, wherein the masterbatch polyamide polymer is between 5 wt. % and 25 wt. % of the total weight of the polyamide polymer blend.

8. The polyamide polymer blend of claim 6, wherein the at least one of the 5-sulfoisophthalic acid and the 5-sulfoisophthalic acid salt is selected from the group consisting of: sodium 5-sulfoisophthalate, lithium 5-sulfoisophthalate, potassium 5-sulfoisophthalate and combinations thereof.

9. The polyamide polymer blend of claim 6, wherein the terminated polyamide polymer has an amine end group concentration from 25 millimoles per kilogram to 40 millimoles per kilogram and a carboxyl end group concentration from 18 millimoles per kilogram to 50 millimoles per kilogram.

10. The polyamide polymer blend of claim 6, wherein the terminated polyamide polymer has an amine end group concentration of less than 25 millimoles per kilogram and a carboxyl end group concentration of less than 18 millimoles per kilogram.

11. The polyamide polymer blend of claim 6, wherein the terminated polyamide polymer has a total termination from 20% to 90%.

12. The polyamide polymer blend of claim 6, wherein the polyamide polymer blend has a formic acid viscosity from about 30 FAV to about 100 FAV, as measured by ASTM D-789-07.

13. The polyamide polymer blend of claim 6, wherein the polyamide polymer blend has a color difference ΔE is less than 10, per CIE DE2000.

14. A method of making a masterbatch polyamide polymer comprising:
providing caprolactam, a diamine, and at least one of 5-sulfoisophthalic acid and a 5-sulfoisophthalic acid salt, to a reactor;
mixing the caprolactam, the diamine, and the at least one of the 5-sulfoisophthalic acid and the 5-sulfoisophthalic acid salt together in the reactor; and
reacting the caprolactam, the diamine, and the at least one of the 5-sulfoisophthalic acid and the 5-sulfoisophthalic acid salt within the reactor at a reaction temperature to form the masterbatch polyamide polymer, the masterbatch polyamide polymer comprising:
   a residue of caprolactam;
   a residue of the diamine; and
   a residue of at least one of 5-sulfoisophthalic acid and a 5-sulfoisophthalic acid salt,
   wherein a concentration of the residue of the at least one of 5-sulfoisophthalic acid and the 5-sulfoisophthalic acid salt is from 0.5 wt. % to 20 wt. % based on a total weight of the masterbatch polyamide polymer,
   whereby the masterbatch polyamide polymer is capable of conferring stain resistance to a terminated polyamide polymer while maintaining the processability of the terminated polyamide polymer, wherein processability is defined by a melt stability within a range between 255° C. and 275° C.

15. The method of claim 14, wherein, in the providing step, the at least one of the 5-sulfoisophthalic acid and the 5-sulfoisophthalic acid salt is selected from the group consisting of: sodium 5-sulfoisophthalate, lithium 5-sulfoisophthalate, potassium 5-sulfoisophthalate and combinations thereof.

16. The method of claim 14, wherein, in the providing step, the diamine includes hexamethylenediamine.

17. The method of claim 14, wherein in the reacting step, the reaction temperature is from about 225° C. to about 290° C.

* * * * *